United States Patent [19]
Park

[11] Patent Number: 5,969,879
[45] Date of Patent: Oct. 19, 1999

[54] COMPACT ZOOM LENS SYSTEM

[75] Inventor: Young-Woo Park, Kyeongsangnam-do, Rep. of Korea

[73] Assignee: Samsung Aerospace Industries, Ltd., Kyeongsangnam-do, Rep. of Korea

[21] Appl. No.: 09/122,635

[22] Filed: Jul. 27, 1998

[30] Foreign Application Priority Data

Jul. 25, 1997 [KR] Rep. of Korea ...................... 97-35038

[51] Int. Cl.⁶ .............................. G02B 15/14; G02B 3/02
[52] U.S. Cl. .......................... 359/687; 359/715; 359/684
[58] Field of Search ................................... 359/687, 686, 359/715, 684, 774

[56] References Cited

U.S. PATENT DOCUMENTS

| | | | |
|---|---|---|---|
| 3,501,224 | 3/1970 | Takahashi | 359/687 |
| 5,313,331 | 5/1994 | Mihara | 359/687 |
| 5,321,552 | 6/1994 | Horiuchi et al. | 359/687 |
| 5,341,243 | 8/1994 | Okuyama et al. | 359/687 |
| 5,530,592 | 6/1996 | Tochigi | 359/687 |

FOREIGN PATENT DOCUMENTS

| | | |
|---|---|---|
| 61-123009 | 6/1986 | Japan. |
| 61-178917 | 8/1986 | Japan. |
| 63-44614 | 2/1988 | Japan. |
| 3-259209 | 11/1991 | Japan. |
| 5-72474 | 3/1993 | Japan. |
| 7-270684 | 10/1995 | Japan. |
| 8-5920 | 1/1996 | Japan. |

*Primary Examiner*—Georgia Epps
*Assistant Examiner*—Evelyn A. Lester
*Attorney, Agent, or Firm*—Finnegan, Henderson, Farabow, Garrett & Dunner, L.L.P.

[57] ABSTRACT

Disclosed is a compact zoom lens system. The lens systems includes a first lens group having positive refractive power; a second lens group having negative refractive power; a third lens group having positive refractive power; and a fourth lens group having positive refractive power. The first lens group and the third lens group are fixed against an image plane. The second lens group is linearly movable for variable magnification. The fourth lens group is able to compensate for moving of an image plane and is linearly movable toward an object for focusing. The lens system is governed by the following relationship: $0<|f_{II-2}/f_{II-3}|<1.2$, where $f_{II-2}$ is a focal length of a second lens of the second lens group, and $f_{II-3}$ is a focal length of a third lens of the second lens group.

11 Claims, 8 Drawing Sheets

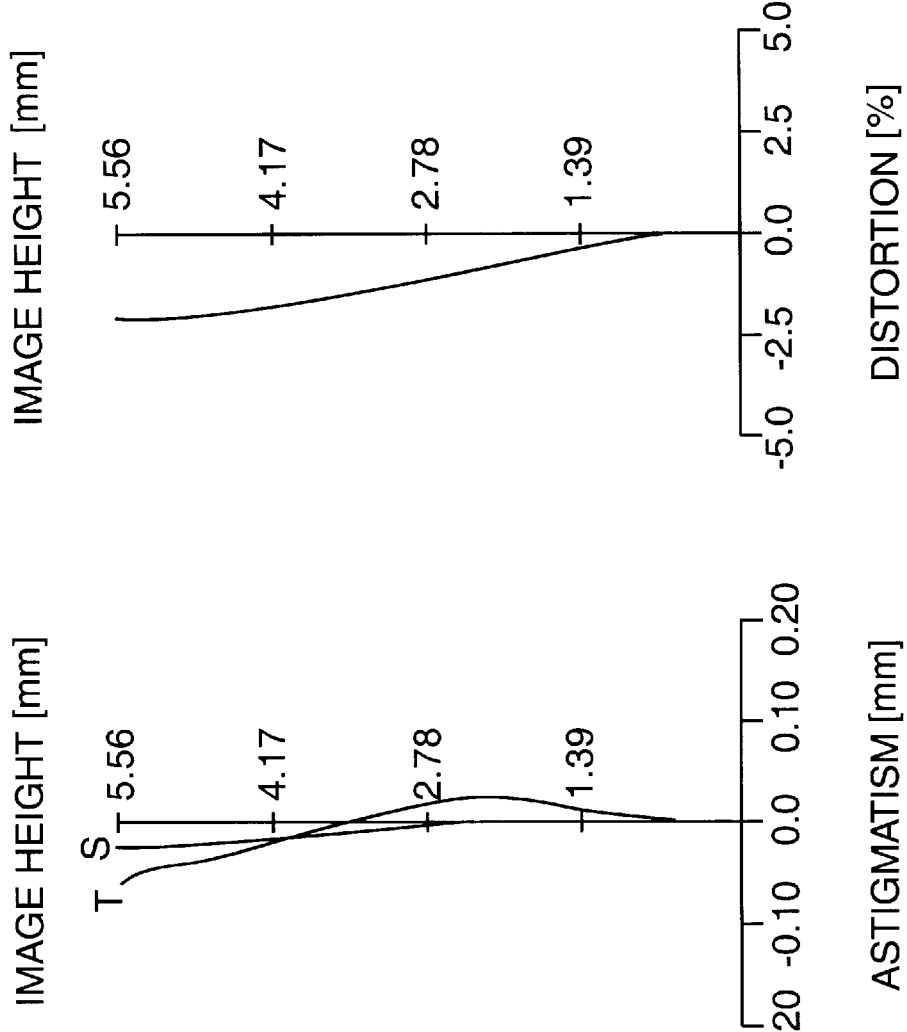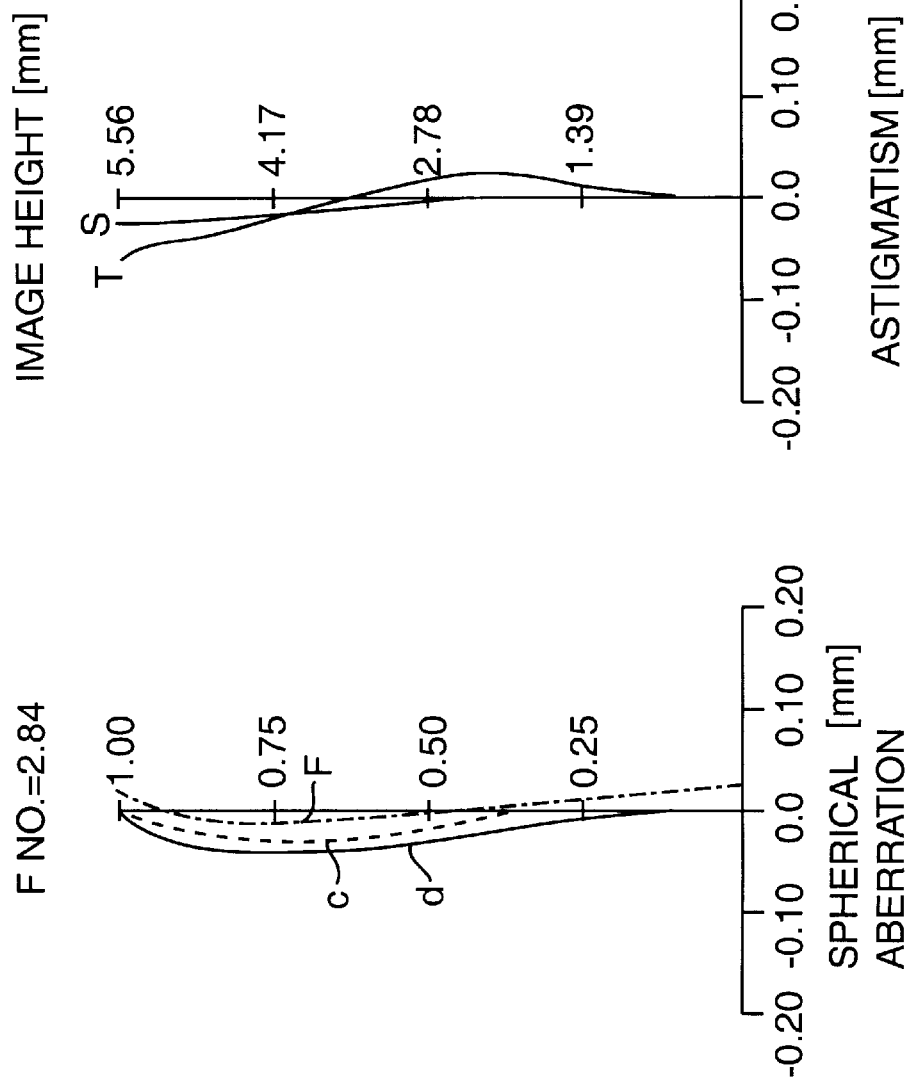

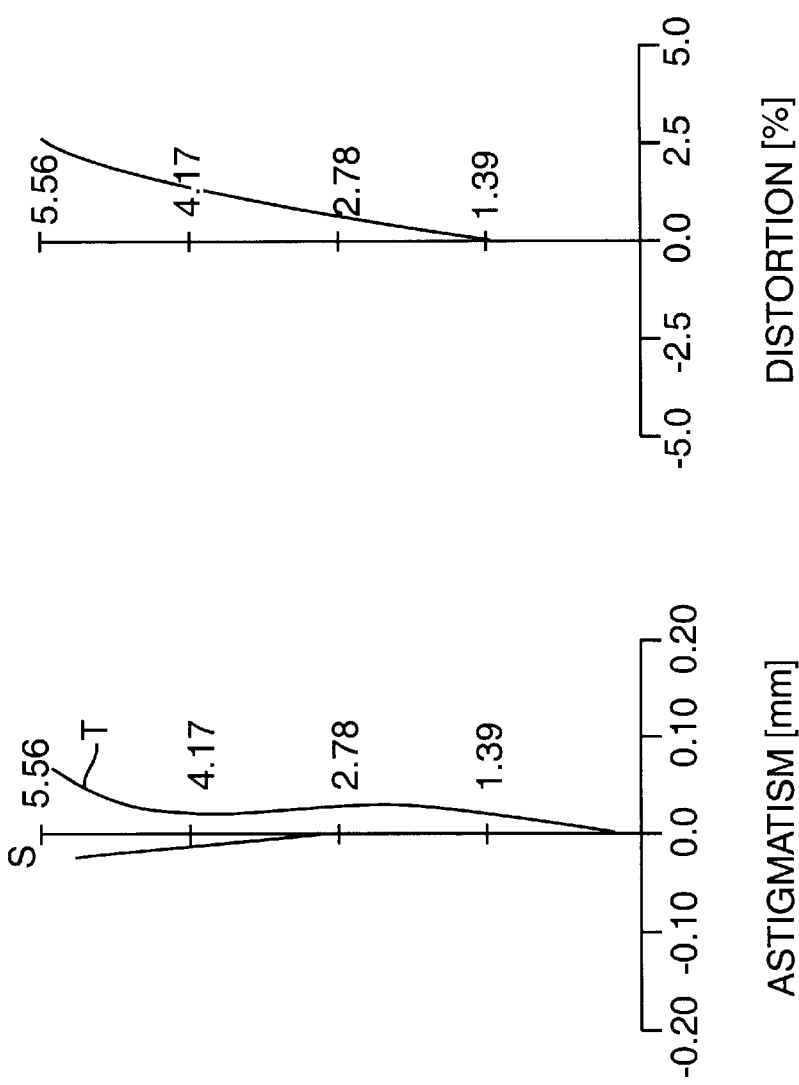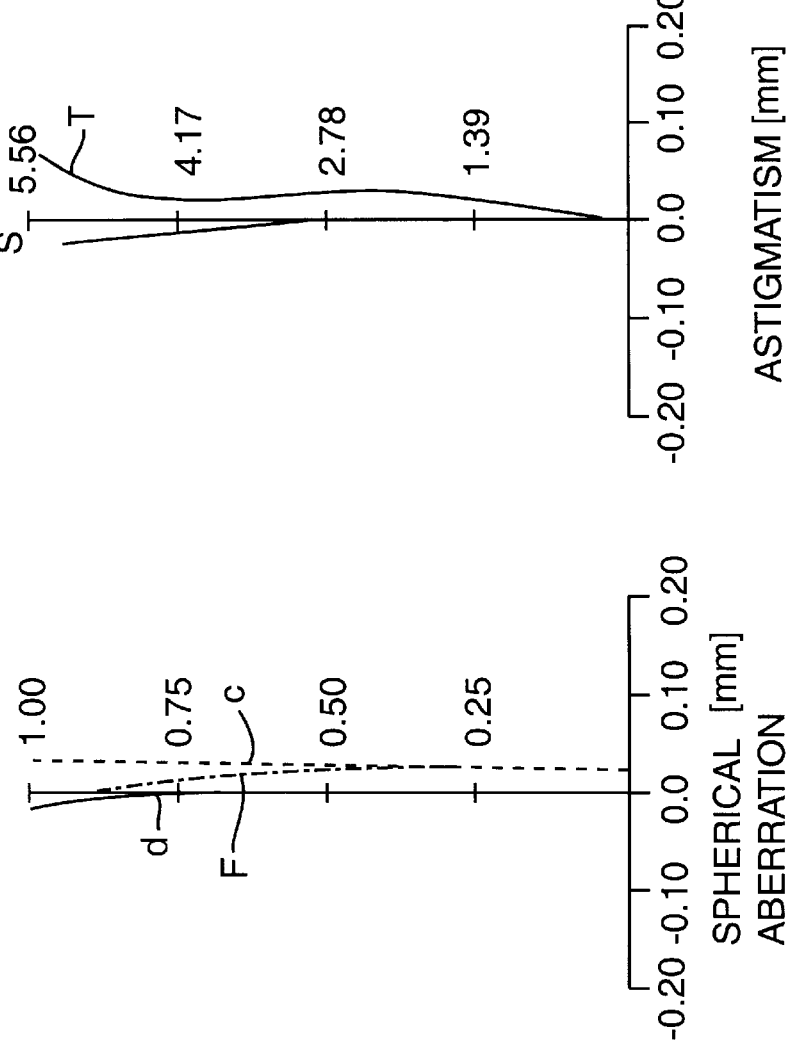

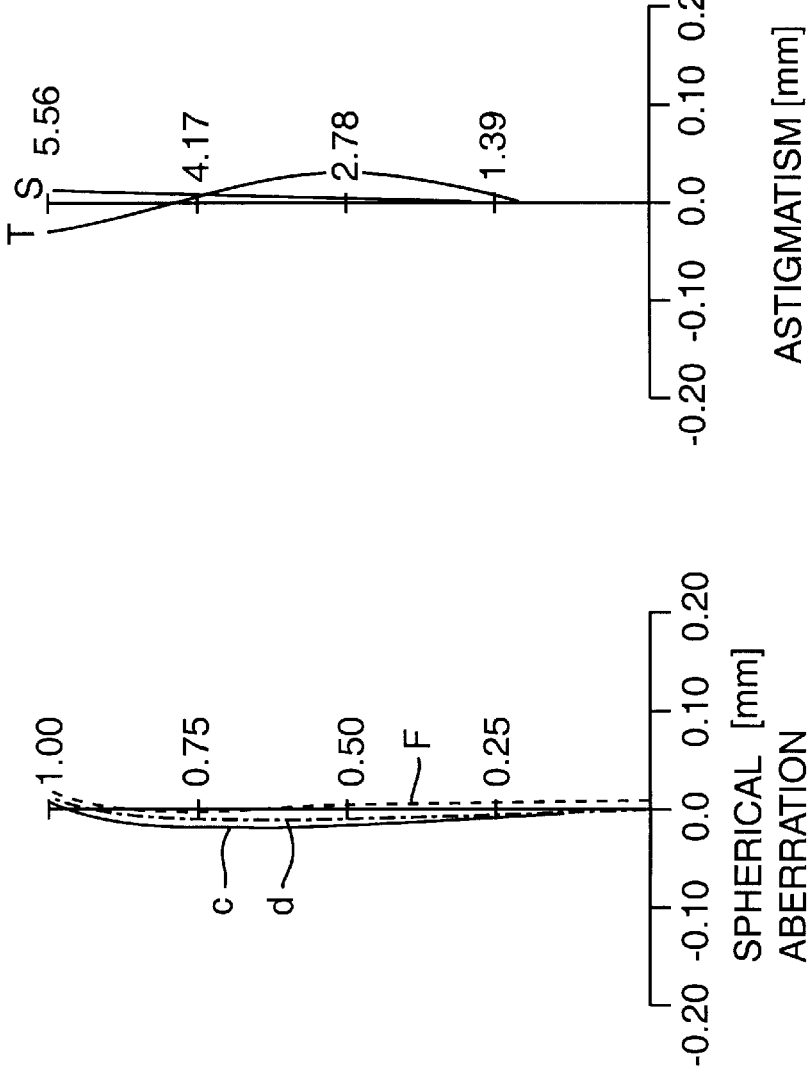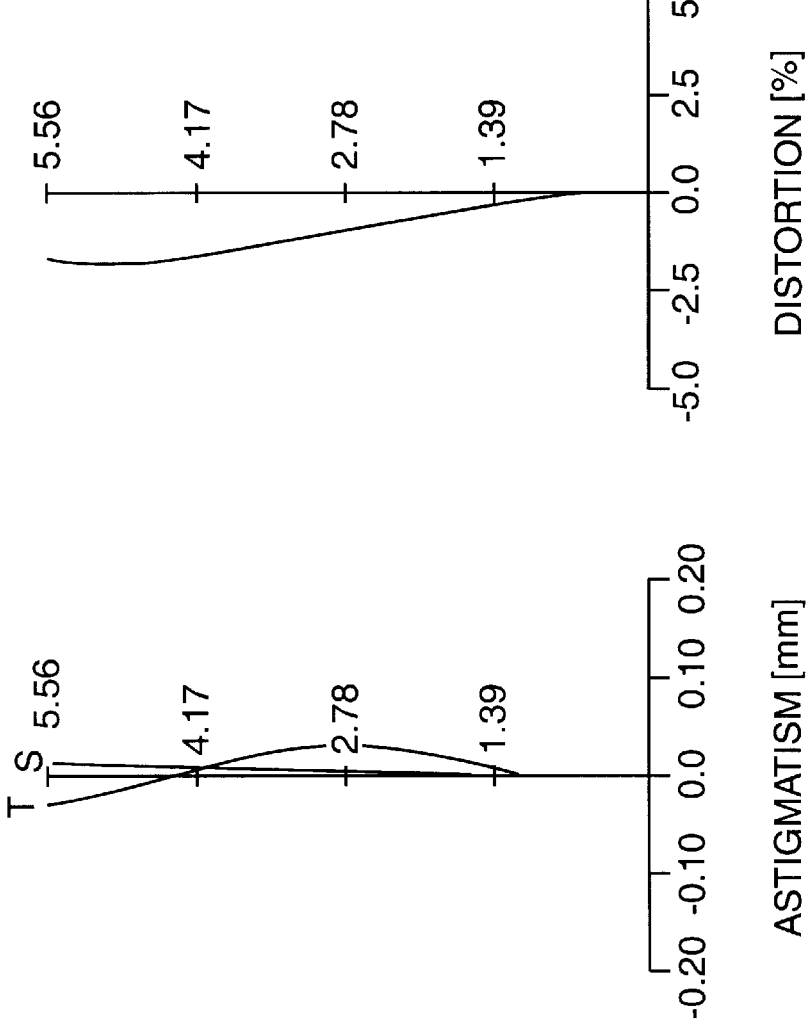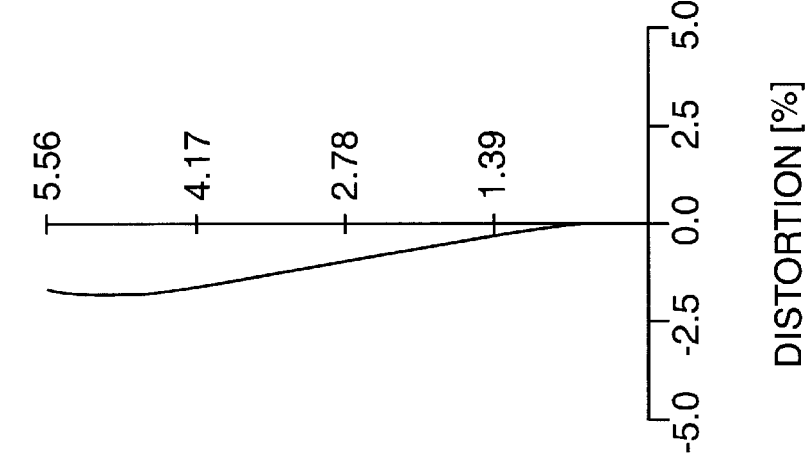

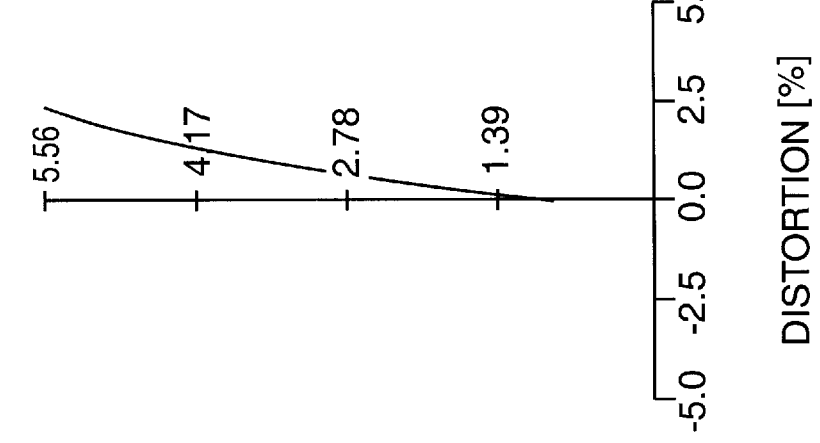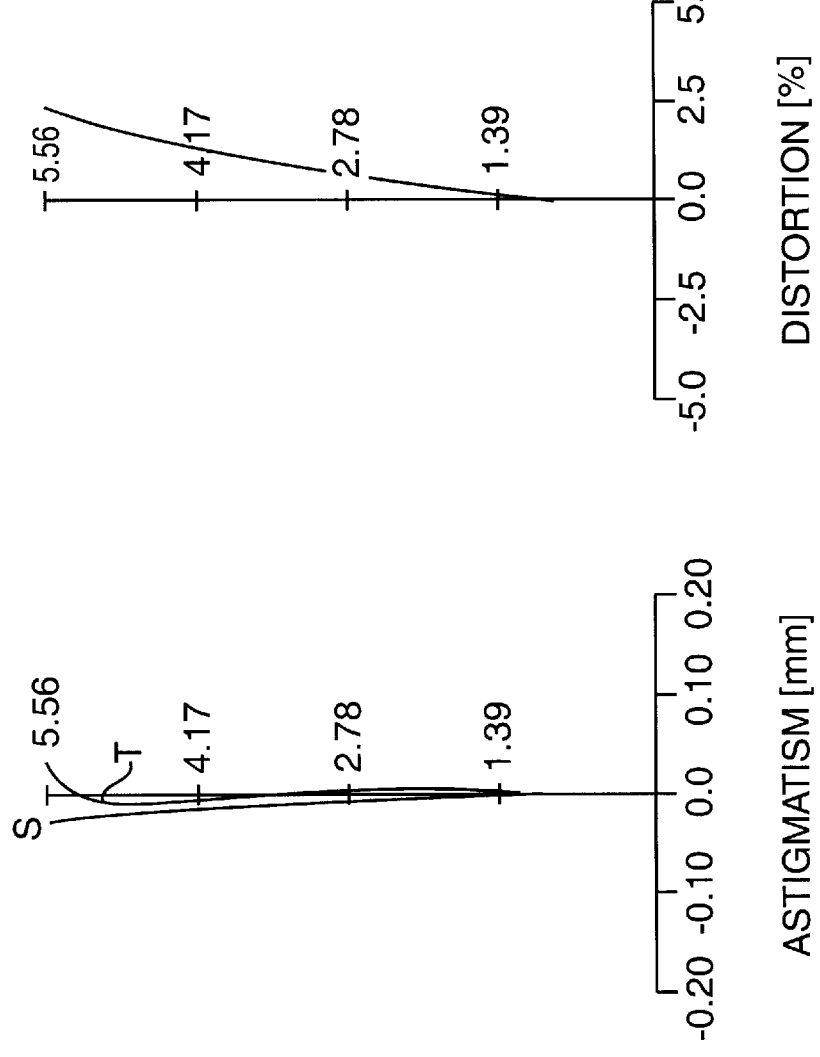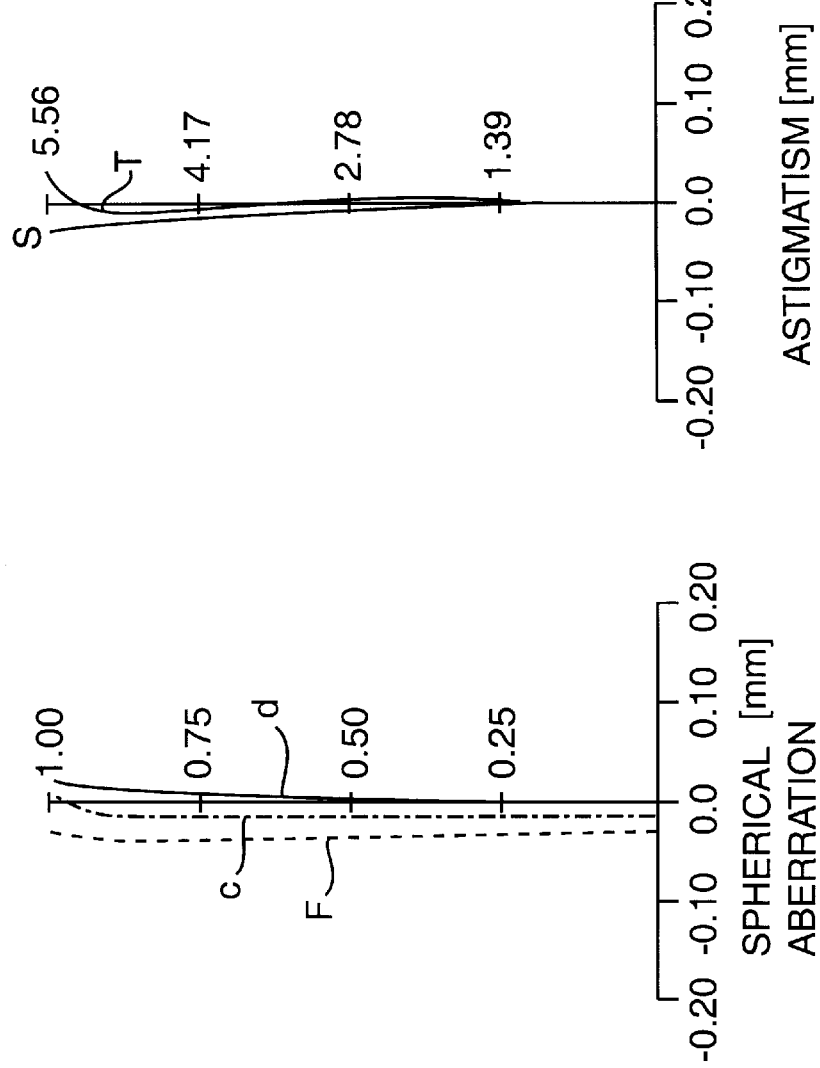

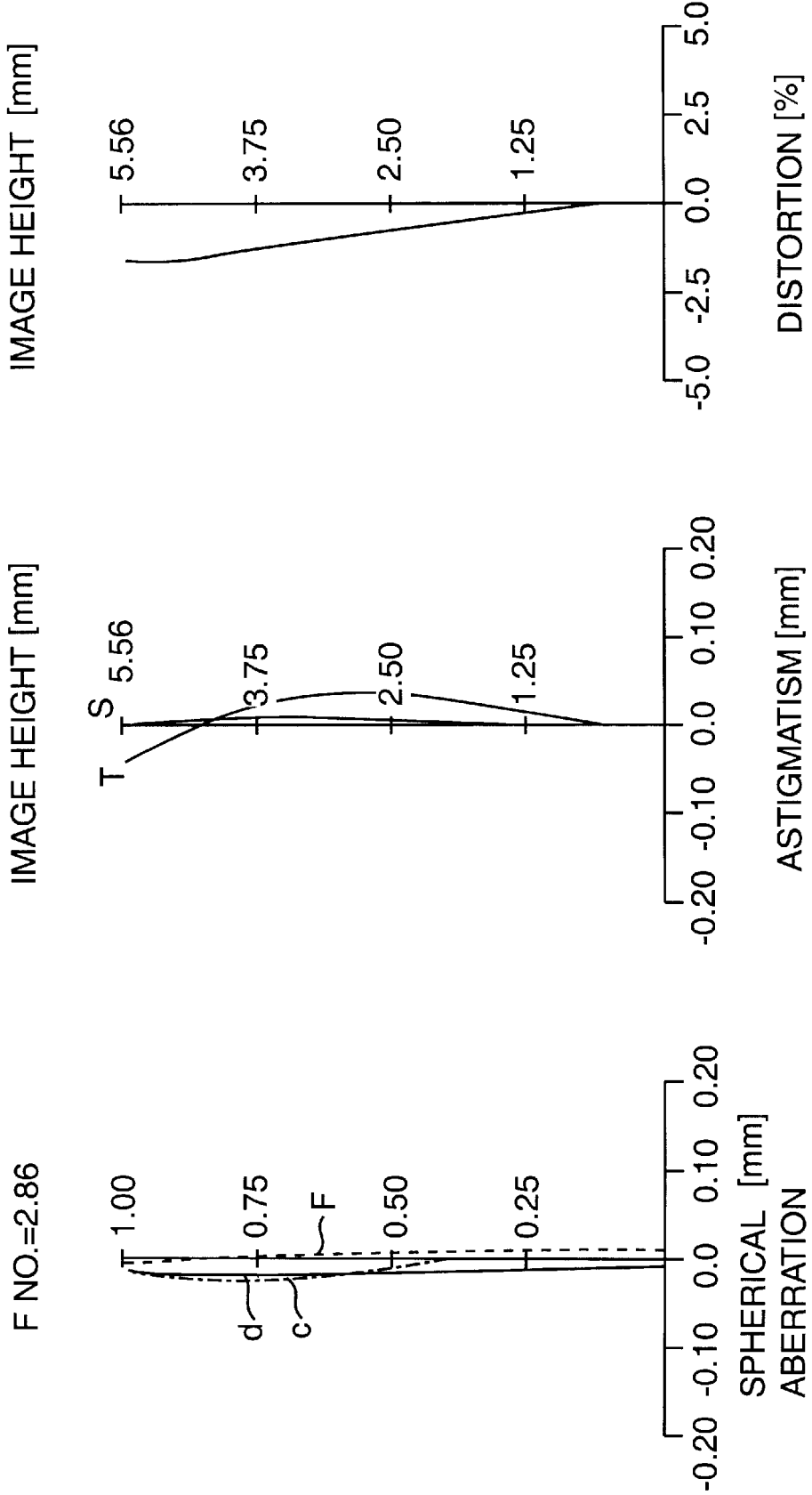

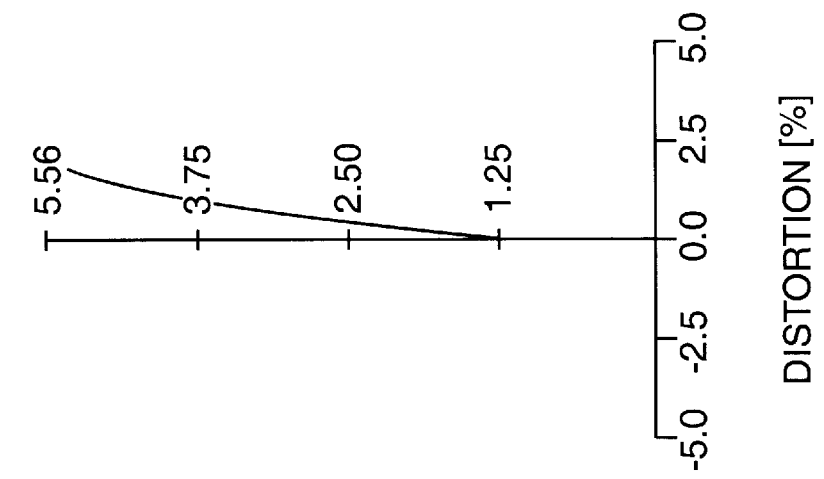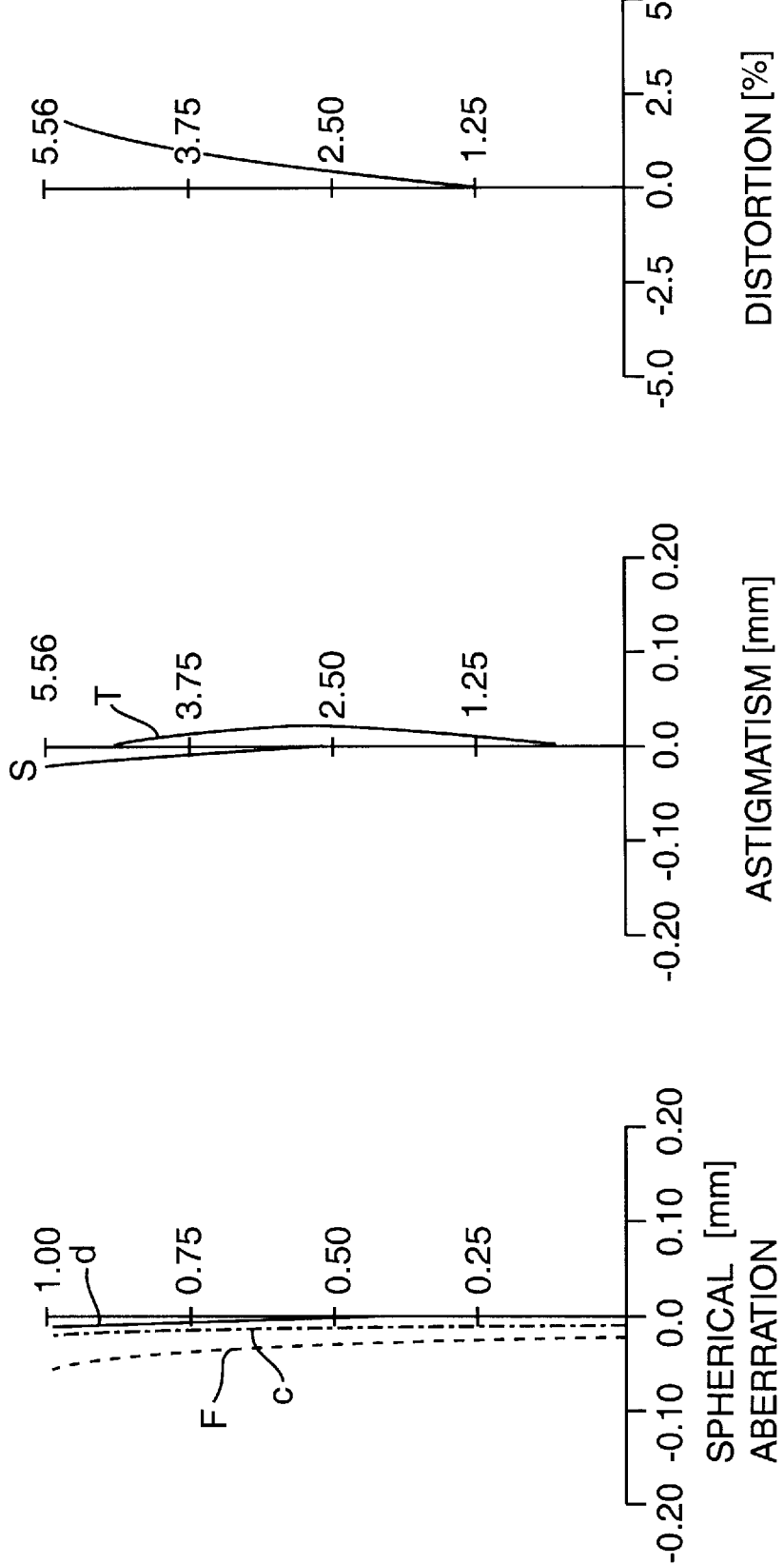

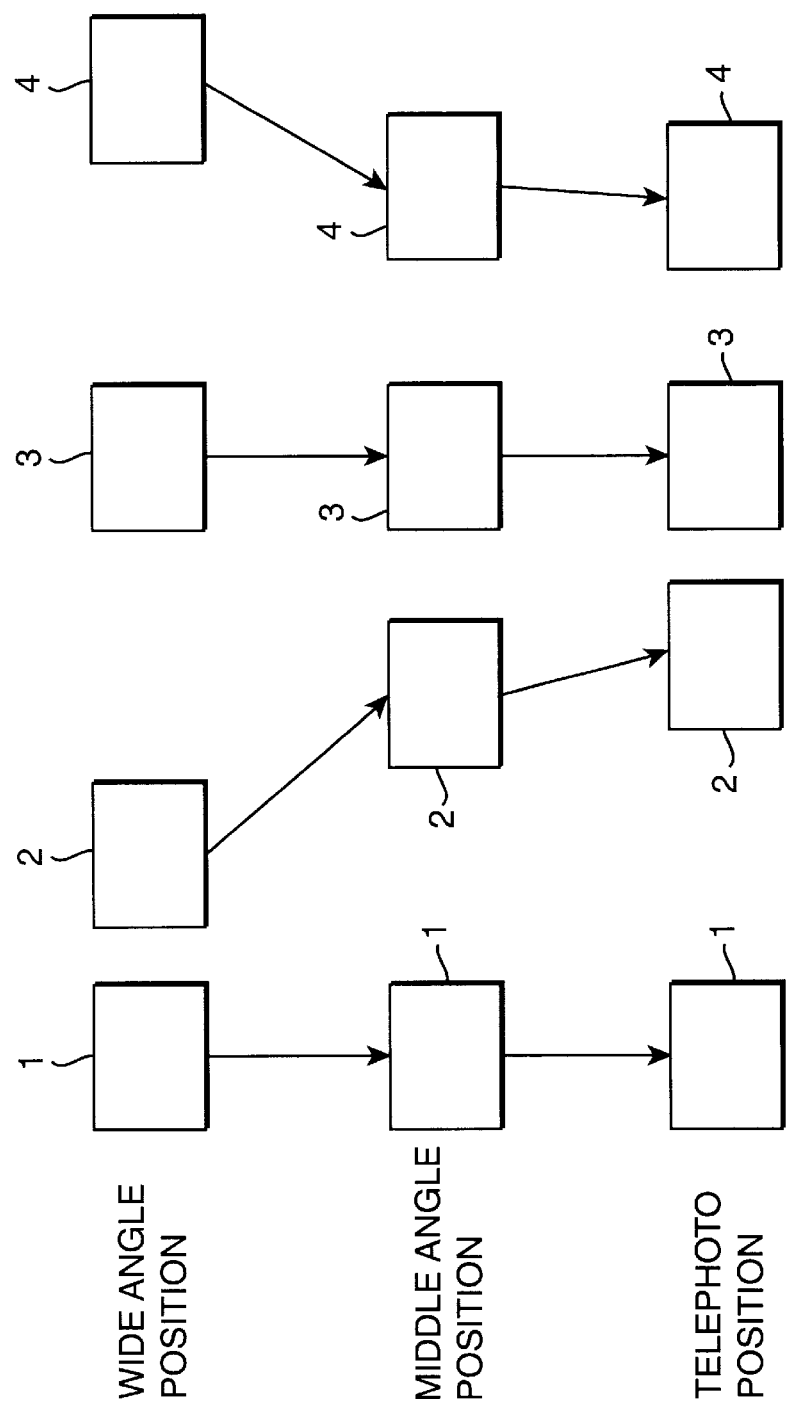

COMPACT ZOOM LENS SYSTEM

BACKGROUND OF THE INVENTION

1. Field of the Invention

The present invention relates to a zoom lens system, and more particularly, to a rear-focus-type zoom lens system which is compact in size.

2. Description of the Related Art

Electronic cameras are becoming increasingly smaller and lighter. As a result, when a zoom lens system is utilized, the same must also be small in size and light in weight. To achieve this, the zoom lens system is made shorter, an effective diameter of a first lens nearest to a photographic object is decreased, and the overall structure is simplified.

The zoom lens system generally includes first, second, third, and fourth lens groups. The first lens group has a positive refractive power and is provided closest to a photographic object. The second lens group has a negative refractive power and moves along an optical axis for variable magnification. The third lens group has a negative refractive power and maintains a fixed image plane while the magnification is varied. The fourth lens group has a positive refractive power and is held at a fixed position closest to an image plane.

A lens system having a greater size and weight is required when focusing by moving a first lens group inwardly and outwardly. However, with increasing use of motors for focusing lens systems, inner and rear focus methods are becoming more commonplace. Using these focusing methods, the total length of the optical system is not varied while the lens groups are driven. Thus, it is possible to minimize the size of the motor.

When focusing using the above rear focus method, a fourth lens group, out of a total of four lens groups, moves along an optical axis.

In a lens system utilizing the rear focus method, an effective diameter of the first lens group is typically smaller than that of the zoom lens system in which the first lens group is moved. Using the rear focus method, it is easier to minimize the size of the entire lens system. Furthermore, because it is easy to take pictures extremely close to an object and because it is easier to move the relatively smaller and lighter lens groups, speedy focus control is possible.

However, large aberration variations occur when focusing with the above rear-focus-type zoom lens. In addition, it is difficult to design the lens system to be lightweight and compact while enabling high optical performance over an entire range of short and remote distances from an object. Furthermore, when a wide angle and rear-focus-type zoom lens is used, it is difficult to achieve a high optical performance over an entire variable magnification range.

Conventional rear-focus-type zoom lens systems have been proposed in the following patents:

(1) Japanese Laid-Open Patent Application No. Sho 63-44614,
(2) Japanese Laid-Open Patent Application No. Hei 3-259209,
(3) Japanese Laid-Open Patent Application No. Hei 8-5920,
(4) Japanese Laid-Open Patent Application No. Hei 7-270684, and
(5) Japanese Laid-Open Patent Application No. Hei 5-72474.

The lens systems described in Japanese Laid-Open Patent Application Nos. Sho 63-44614, Hei 3-259209, and Hei 8-5920 have first, second, third, and fourth lens groups. The first lens group has a positive refractive power and is positioned closest to a photographic object. The second and third lens groups have a negative refractive power. The fourth lens group has a positive refractive power. The first and the fourth lens groups are fixed, while the second and the third lens groups move for variable magnification.

Although the lens systems described in Japanese Laid-Open Patent Application Nos. Sho 63-44614 and Hei 3-259209 perform well optically, they require substantial drive power for varying magnification because the variable magnification lens groups have four or more lenses. Furthermore, because the distance between the second and third lens groups is small, it is difficult to manufacture these lens systems.

In Japanese Laid-Open Patent Applications Nos. Hei 7-270684, and Hei 5-72474, first and third lens groups are fixed, a second lens group performs a variable magnification, and a fourth lens group both focuses and compensates for image plane movement occurring during variable magnification.

However, the lens systems described in Japanese Laid-Open Patent Application No. Hei 7-270684 has a high level of residual aberration, making it difficult to achieve a high resolution level. Also, although the lens system described in Japanese Laid-Open Patent Application No. Hei 5-72474 has a relatively simple structure and performs well optically, it is difficult to manufacture because two lenses that are aspherical on both sides are used.

SUMMARY OF THE INVENTION

The advantages and purpose of the invention will be set forth in part in the description which follows, and in part will be obvious from the description, or may be learned by practice of the invention. The advantages and purpose of the invention will be realized and attained by the elements and combinations particularly pointed out in the appended claims.

It is an object of the present invention to provide a rear-focus-type compact zoom lens system which realizes a high variable magnification and enhanced wide angle capabilities.

It is another object of the present invention to provide a rear-focus-type compact zoom lens which is small in size while providing good optical performance over a wide range of photographing conditions from wide angle position to telephoto position, and from short to long distances from an object.

It is still another object of the present invention to provide a rear-focus-type compact zoom lens in which a rear focal length is long.

To attain the advantages and in accordance with the purposes of the invention, as embodied and broadly described herein, the invention comprises a compact zoom lens system including, from an object, a first lens group having a positive refractive power; a second lens group having a negative refractive power; a third lens group having a positive refractive power; and a fourth lens group having a positive refractive power.

The first lens group and the third lens group are fixed against an image plane. The second lens group is movable along an optical axis for variable magnification. The fourth lens group is movable along the optical axis to compensate for moving of an image plane for focusing.

The second lens group has three lenses, wherein, $$1.0<|f_{II\text{-}2}/f_{II\text{-}3}|<1.2,$$

where $f_{II\text{-}2}$ is a focal length of a second lens of the second lens group and $f_{II\text{-}3}$ is a focal length of a third lens of the second lens group.

BRIEF DESCRIPTION OF THE DRAWINGS

Further objects and other advantages of the present invention will become apparent from the following description in conjunction with the attached drawings, in which:

FIGS. 2A to 2C are views illustrating aberrations in a wide angle position of a compact zoom lens system in accordance with a first preferred embodiment of the present invention;

FIGS. 3A to 3C are views illustrating aberrations in a telephoto position of a compact zoom lens system in accordance with the first preferred embodiment of the present invention;

FIGS. 4A to 4C are views illustrating aberrations in a wide angle position of a compact zoom lens system in accordance with a second preferred embodiment of the present invention;

FIGS. 5A to 5C are views illustrating aberrations in a telephoto position of a compact zoom lens system in accordance with the second preferred embodiment of the present invention;

FIGS. 6A to 6C are views illustrating aberrations in a wide angle position of a compact zoom lens system in accordance with a third preferred embodiment of the present invention;

FIGS. 7A to 7C are views illustrating aberrations in a telephoto position of a compact zoom lens system in accordance with the third preferred embodiment of the present invention; and FIGS. 8A to 8C are views illustrating lens groups in wide angle, middle angle, and telephoto positions of a compact zoom lens system in accordance with the preferred embodiment of the present invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1A:
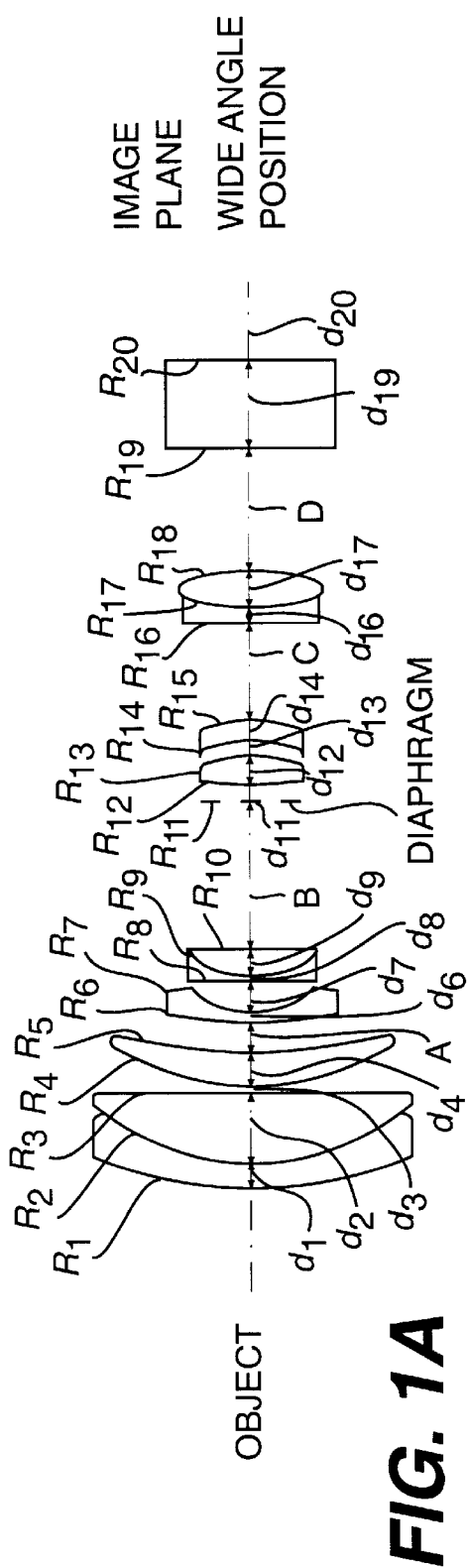
FIG. 1A is a sectional view of a compact zoom lens system in a wide angle position in accordance with a preferred embodiment of the present invention.
Figure 1B:
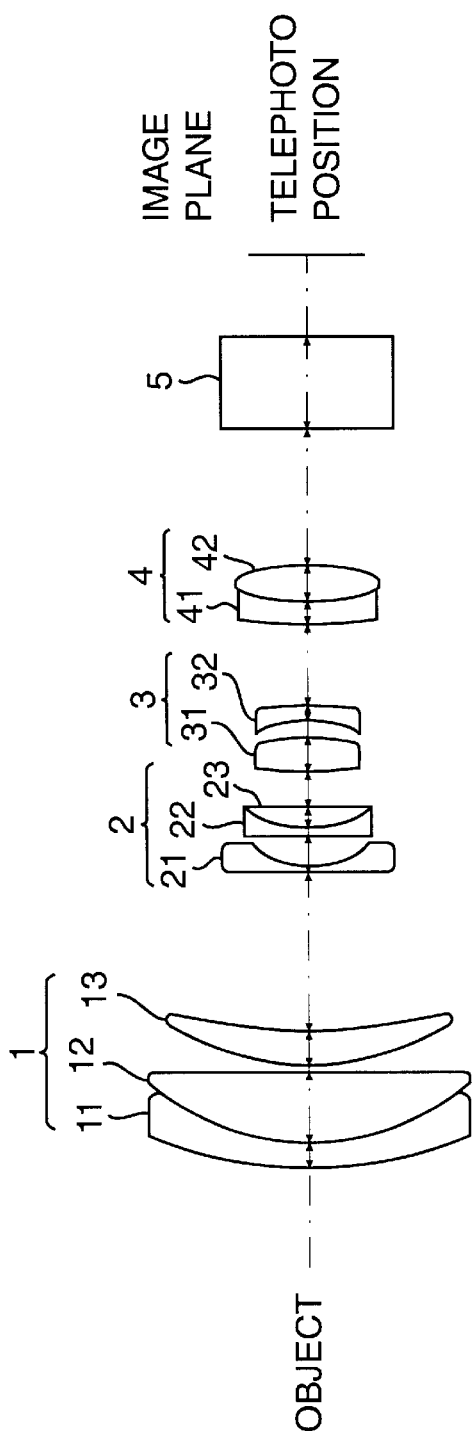
FIG. 1B is a sectional view of the compact zoom lens in a telephoto position in accordance with the preferred embodiment of the present invention.

As shown in FIGS. 1A and 1B, a compact zoom lens system in accordance with a preferred embodiment of the present invention includes first, second, third, and fourth lens groups 1, 2, 3, and 4, and a filter 5. The first lens group 1 has a positive refractive power. The second lens group 2 has a negative refractive power. The third lens group 3 has a positive refractive power. The fourth lens group 4 has a positive refractive power.

The first lens group 1 has three lenses 11, 12, and 13. The first lens 11 is a meniscus lens. Surface R1 on an object side of the first lens 11 is convex. The first lens 11 has a negative refractive power. The second lens 12 has a positive refractive power. The second lens 12 is cemented to the first lens 11 at surface R2. The third lens 13 is a meniscus lens and has a positive refractive power. Surface R4 on an object side of the third lens 13 is convex.

The second lens group 2 has three lenses 21, 22, and 23. The first lens 21 is a meniscus lens and has a negative refractive power. Surface R7 on an image plane side of the first lens 21 is concave. The second lens 22 has a negative refractive power and is biconcave. Surface R9 on an object side of the third lens 23 is convex. The third lens 23 is cemented to the second lens 22 at surface R9 and is a meniscus lens having a positive refractive power.

The third lens group 3 has two lenses 31 and 32. The first lens 31 has a positive refractive power and is biconvex. The second lens 32 is a meniscus lens and has a negative refractive power. Surface R14 of the second lens 32 facing the object side is concave.

The fourth lens group 4 has first and second lenses 41 and 42. The first lens 41 is a meniscus lens and has a negative refractive power. Surface R17 of the first lens 41 facing the image plane side is concave. The second lens 42 is cemented to the first lens 41 at surface R17. The second lens 42 is biconvex and has a positive refractive power. Surface R18 of the second lens 42 facing the image plane side is aspherical.

The filter 5 is located adjacent to the image plane side of the fourth lens group 4.

In operation, during variable magnification from a wide angle position to a telephoto position, the first and third lens groups 1 and 3 are fixed, the second lens group 2 moves toward an image plane side, and the fourth lens group 4 moves toward the object side to compensate for image plane movement occurring during variable magnification.

Because the second lens 22 and the third lens 23 of the second lens group 2 are cemented together, a sensitivity of an image plane curvature corresponding to a curvature value does not increase. Thus, manufacturing of the lenses is simplified.

The aspherical surface R18 of the second lens 42 of the fourth lens group 4 can be expressed by the following equation:

$$Z = \frac{Cy^2}{1 + (1 - (K+1)C^2y^2)^{1/2}} + A_4y^4 + A_6y^6 + A_8y^8 + A_{10}y^{10}$$

Where, Z is a distance in a direction of an optical axis from the lens vertex;

y is a distance in vertical direction from the optical axis;

C is a reciprocal of the radius of the lens curvature;

K is a conic constant; and $A_4$, $A_6$, $A_8$, and $A_{10}$ are coefficients of the aspherical surface.

The compact zoom lens system in accordance with the preferred embodiment of the present invention satisfies the following conditions:

$1.0 < |f_{II-2}/f_{II-3}| < 1.2$ (1), $1.0 < |f_{IV-1}/f_{IV}| < 1.5$ (2), $2.0 < |f_{IV-1}/f_{IV-2}| < 2.5$ (3), and $20 < ((V_{II-2} - ((V_{II-1})) < 20$ (4), Where $f_{II-2}$ is a focal length of the second lens 21 of the second lens group 2, $f_{II-3}$ is a focal length of the third lens 23 of the second lens group 2, $f_{IV}$ is a focal length of the fourth lens group 4, $f_{IV-1}$ is a focal length of the first lens 41 of the fourth lens group 4, $f_{IV-2}$ is a focal length of the second lens 42 of the fourth lens group 4, $V_{II-1}$ is a dispersion value of the first lens 21 of the second lens group 2, and $V_{II-2}$ is a dispersion value of the second lens 22 of the second lens group 2.

Condition (1) relates to limits of a refracting power of the second lens 22 and the third lens 23 of the second lens group 2. If the lower limit of condition (1) is violated, the refracting power of the second lens group 2 decreases. Accordingly, although variations in aberrations are minimized, the amount of movement needed to attain specific variable magnification ratios increases such that the length of the entire optical system increases. Also, if the upper limit of the condition (1) is violated, the refracting power of the second lens group 2 increases. However, while it is possible to minimize the size of the zoom lens system, the curvature of the image plane increases.

Therefore, when the refracting power of the second lens group 2 is defined within the range of condition (1), the refracting power of the second and third lenses 22 and 23 of the second lens group 2 increases, and the curvature aberration of the image plane is reduced such that an additional lens or lenses to compensate for the curvature of the image plane is not needed.

Condition (2) relates to limits of refracting power of the first lens 41 and the second lens 42 of the fourth lens group 4. If the lower limit of condition (2) is violated, the refracting power of the fourth lens group 4 decreases. As a result, the amount of movement required to perform variable magnification increases such that a rear focal length increases more than necessary. Furthermore, if the upper limit of condition (2) is violated, the refracting power of the fourth lens group 4 increases. Although the amount of movement necessary for variable magnification decreases, it becomes difficult to compensate for aberrations occurring due to variations in magnification.

Therefore, because refracting powers of the second and fourth lens groups 2 and 4 are defined within the ranges of condition (1) and condition (2), respectively, the amount of movement of the second and fourth lens groups 2 and 4 is reduced during a variable magnification. As a result, suitable distances between the second and fourth lens groups 2 and 4 and the third lens group 3, which is fixed, can be maintained.

Condition (3) relates to limits of refracting power of the first and second lenses 41 and 42 of the fourth lens group 4. If the lower limit of condition (3) is violated, the amount of movement needed for variable magnification increases and the total length of the zoom lens system increases such that aberration changes increase as a magnification is varied. Furthermore, if the upper limit of condition (3) is violated, it becomes difficult to compensate for spherical aberration along an optical axis when in a telephoto position, and it is also difficult to satisfy telecentric conditions in which peripheral light beams and main light beams enter the zoom lens system in a parallel fashion.

In image pickup devices, such as charge coupled devices (CCDs), aberrations along the optical axis greatly affect resolution. Because the refractive powers of the first and second lenses 41 and 42 of the fourth lens group 4 are defined within the ranges set forth by condition (3), the lens system compensates for these aberrations, such that telecentric conditions can be met. Accordingly, resolution is improved.

Condition (4) relates to compensation of chromatic aberration for the entire compact zoom lens system. If the lower limit of condition (4) is violated, it becomes difficult to compensate for aberrations along the optical axis and magnification of chromatic aberrations. If the upper limit of condition (4) is violated, manufacturing of the lenses becomes difficult because not many lenses meet such specifications.

Therefore, if the dispersion value of the second lens group 2 is defined within the ranges of condition (4), aberrations along the optical axis and magnification chromatic aberrations are reduced. As a result, a small number of aspherical lenses are required such that manufacturing costs are decreased.

Data related to the rear-focus-type compact zoom lens of the preferred embodiments, satisfying the above conditions, is shown in the following tables. In the tables, r represents a radius of curvature of refracted surfaces, d represents a distance between lenses or a thickness of a lens, nd represents a refractive index for a d-line, and v represents an Abbe number for the lenses. In each of the tables, all units of length are in millimeters.

Data for the first preferred embodiment of the present invention is shown in Table 1. In the first preferred embodiment, the viewing angle 2ω ranges from 21.14° to 58.02°, the focal length ranges from 10.03 to 29.79, and the F number ranges from 2.77 to 2.84.

TABLE 1

| Surface No. | Radius of Curvature (r) | Distance (d) | Refractive Index (nd) | Abbe Number (v) |
|---|---|---|---|---|
| 1 | 63.160 | 1.00 | 1.847 | 23.8 |
| 2 | 31.984 | 5.18 | 1.62 | 60.3 |
| 3 | −183.000 | 0.10 | | |
| 4 | 22.207 | 3.50 | 1.62 | 60.3 |
| 5 | 49.495 | A | | |
| 6 | 144.000 | 0.80 | 1.757 | 47.7 |
| 7 | 7.295 | 3.53 | | |
| 8 | −36.452 | 0.80 | 1.487 | 70.4 |
| 9 | 8.268 | 2.80 | 1.806 | 33.3 |
| 10 | 38.807 | B | | |
| 11 | Diaphragm | 1.00 | | |
| 12 | 21.945 | 2.00 | 1.773 | 49.6 |
| 13 | −13.270 | 0.77 | | |
| 14 | −10.427 | 0.80 | 1.717 | 29.5 |
| 15 | −57.458 | C | | |
| 16 | 29.220 | 1.60 | 1.847 | 23.8 |
| 17 | 12.680 | 2.80 | 1.589 | 61.3 |
| *18 | −15.335 | D | | |
| 19 | ∞ | 5.00 | 1.517 | 64.2 |
| 20 | ∞ | 6.0 | | |

In the above table, an asterisk ("*") represents an aspherical surface, and A, B, C, and D are variable distances between lenses during variable magnification. Values of the variable distances A, B, C, and D at the wide angle position, the normal position, and the telephoto position are shown in Table 2.

TABLE 2

| Distances | Telephoto position $2\omega = 21.14°$ | Normal position $2\omega = 31.02°$ | Wide-angle position $2\omega = 58.02°$ |
|---|---|---|---|
| A | 1.573 | 10.410 | 14.697 |
| B | 15.183 | 6.345 | 2.058 |
| C | 7.935 | 6.078 | 6.062 |
| D | 5.784 | 7.643 | 7.668 |

The aspherical coefficients $A_4$, $A_6$, $A_8$, and $A_{10}$ of the above surface number 18 (R18) are shown in Table 3 below.

TABLE 3

| | K | $A_4$ | $A_6$ | $A_8$ | $A_{10}$ |
|---|---|---|---|---|---|
| R18 | −5.934884 | −0.114142E−03 | 0.299227E−06 | 0.710609E−07 | −0.153597E−08 |

Data for the second preferred embodiment of the present invention is shown in Table 4. In the second preferred embodiment, the viewing angle $2\omega$ ranges from 20.98° to 58.16°, the focal length ranges from 9.99 to 30.01, and the F number ranges from 2.67 to 2.72.

TABLE 4

| Surface No. | Radius of Curvature (r) | Distance (d) | Refractive Index (nd) | Abbe Number (v) |
|---|---|---|---|---|
| 1 | 61.244 | 1.00 | 1.847 | 23.8 |
| 2 | 28.436 | 5.03 | 1.774 | 49.6 |
| 3 | 409.333 | 0.10 | | |
| 4 | 22.304 | 3.48 | 1.639 | 55.5 |
| 5 | 52.809 | A | | |
| 6 | 57.073 | 0.80 | 1.806 | 33.3 |
| 7 | 6.846 | 4.04 | | |

TABLE 4-continued

| Surface No. | Radius of Curvature (r) | Distance (d) | Refractive Index (nd) | Abbe Number (v) |
|---|---|---|---|---|
| 8 | −29.875 | 0.80 | 1.518 | 59.0 |
| 9 | 8.127 | 2.00 | 1.847 | 23.8 |
| 10 | 35.711 | B | | |
| 11 | diaphragm | 1.00 | | |
| 12 | 20.212 | 2.20 | 1.774 | 49.6 |
| 13 | −12.433 | 0.30 | | |
| 14 | −10.753 | 0.80 | 1.728 | 28.3 |
| 15 | −53.237 | C | | |
| 16 | 19.408 | 0.80 | 1.847 | 23.8 |
| 17 | 10.033 | 2.12 | 1.589 | 61.3 |
| *18 | −24.725 | D | | |
| 19 | ∞ | 5.00 | 1.517 | 64.2 |
| 20 | ∞ | 5.0 | | |

Again, an asterisk ("*") represents an aspherical surface, and A, B, C, and D are variable distances between lenses during variable magnification.

Values of the variable distances A, B, C, and D at the wide angle position, the normal position, and the telephoto position are shown in Table 5 below.

TABLE 5

| Distances | Telephoto position $2\omega = 20.98°$ | Normal position $2\omega = 31.06°$ | Wide-angle position $2\omega = 58.16°$ |
|---|---|---|---|
| A | 4.056 | 12.052 | 15.924 |
| B | 15.578 | 7.581 | 3.71 |
| C | 8.082 | 6.377 | 6.534 |
| D | 5.644 | 7.326 | 7.137 |

The aspherical coefficients $A_4$, $A_6$, $A_8$, and $A_{10}$ of the above surface number 18, R18, are shown in Table 6.

TABLE 6

| | K | $A_4$ | $A_6$ | $A_8$ | $A_{10}$ |
|---|---|---|---|---|---|
| R18 | −7.514932 | 0.271327E-04 | −0.122756E-05 | 0.680569E-07 | −0.119203E-08 |

Data for the third preferred embodiment of the present invention is shown in Table 7. In the third preferred embodiment, the viewing angle 2ω ranges from 21.06° to 58.22°, the focal length ranges from 9.99 to 29.92, and F number ranges from 2.81 to 2.86.

TABLE 7

| Surface No. | Radius of Curvature (r) | Distance (d) | Refractive Index (nd) | Abbe Number (v) |
|---|---|---|---|---|
| 1 | 57.110 | 1.00 | 1.847 | 23.8 |
| 2 | 26.316 | 5.66 | 1.62 | 60.3 |
| 3 | 727.639 | 0.10 | | |
| 4 | 24.338 | 4.04 | 1.744 | 44.9 |
| 5 | 90.011 | A | | |
| 6 | 418.807 | 0.80 | 1.806 | 33.3 |
| 7 | 7.258 | 3.03 | | |
| 8 | −24.535 | 1.03 | 1.518 | 59.0 |
| 9 | 8.556 | 2.03 | 1.847 | 23.8 |
| 10 | 54.543 | B | | |
| 11 | diaphragm | 1.00 | | |
| 12 | 17.457 | 2.06 | 1.774 | 49.6 |
| 13 | −23.012 | 1.013 | | |
| 14 | −13.992 | 0.80 | 1.728 | 28.3 |
| 15 | −56.548 | C | | |
| 16 | 17.785 | 1.85 | 1.847 | 23.8 |
| 17 | 8.487 | 2.97 | 1.589 | 61.3 |
| *18 | −17.827 | D | | |
| 19 | ∞ | 5.00 | 1.517 | 64.2 |
| 20 | ∞ | 5.0 | | |

Again, an asterisk ("*") represents an aspherical surface, and A, B, C and D are variable distances between lenses during a variable magnification.

Values of the variable distances A, B, C and D at the wide angle position, the normal position, and the telephoto position are shown in Table 8.

TABLE 8

| Distances | Telephoto position 2ω = 21.06° | Normal position 2ω = 31.14° | Wide-angle position 2ω = 58.22° |
|---|---|---|---|
| A | 4.302 | 11.822 | 15.584 |
| B | 14.877 | 7.357 | 3.595 |
| C | 4.93 | 3.636 | 4.06 |
| D | 5.763 | 7.054 | 6.637 |

The aspherical coefficients $A_4$, $A_6$, $A_8$, and $A_{10}$ for surface number 18, R18, are shown in Table 9

TABLE 9

| | K | $A_4$ | $A_6$ | $A_8$ | $A_{10}$ |
|---|---|---|---|---|---|
| r18 | −4.039091 | 0.481850E-04 | −0.242236E-05 | 0.117089E-06 | −0.211988E-08 |

Preferably, the parameters of conditions 1, 2, 3, and 4 for the above embodiments are as shown in Table 10.

TABLE 10

| Parameter | First preferred embodiment | Second preferred embodiment | Third preferred embodiment |
|---|---|---|---|
| $|f_{II-2}/f_{II-3}|$ | 1.104 | 1.018 | 1.032 |
| $|f_{IV-1}/f_{IV}|$ | 1.257 | 1.051 | 1.033 |
| $|f_{IV-1}/f_{IV-2}|$ | 2.246 | 2.059 | 2.070 |
| $(V_{II-2}) - (V_{II-1})$ | 22.7 | 25.7 | 25.7 |

In the compact zoom lens system of the present invention structured as described above, with the use of the rear-focus method through the four lens groups, high magnification and increased wide-angle views can be achieved, the size of the entire lens system is minimized, and a high optical performance is provided over the entire zooming range and over all distances to an object.

Furthermore, because the four lens groups are arranged such that their refractive powers are in the order of positive, negative, positive, and positive, the structure of the inventive lens system is simple and performs exceptionally well optically.

Finally, during variable magnification, when the second lens group moves, because the fourth lens group also moves for compensation, the amount of overall movement of the lens groups is reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A compact zoom lens system having an image plane side and an object side, comprising:
    a first lens group disposed at the object side of the system and having a positive refractive power;
    a second lens group disposed adjacent the first lens group and having a negative refractive power, the second lens group having first, second, and third lenses;
    a third lens group disposed adjacent the second lens group and having a positive refractive power; and
    a fourth lens group disposed at the image plane side of the system and adjacent the third lens group, the fourth lens group having a positive refractive power;
    wherein the first lens group and the third lens group are fixed with respect to an image plane, the second lens group is linearly movable for variable magnification, and the fourth lens group is linearly movable for focusing and compensating for movement of the image plane; and wherein the compact zoom lens system satisfies the following condition:

$$1.0<|f_{II-2}/f_{II-3}|<1.2$$

where $f_{II-2}$ is a focal length of the second lens of the second lens group, and $f_{II-3}$ is a focal length of the third lens of the second lens group.

2. The compact zoom lens system of claim 1, wherein:

the first lens of the second lens group has a negative refractive power and is concave toward an image plane side, the second lens of the second lens group has a negative refractive power and is biconcave, and the third lens of the second lens group has a positive refractive power and is convex toward the object side.

3. The compact zoom lens system of claim 2, wherein the first lens of the second lens group is a meniscus lens.

4. The compact zoom lens system of claim 2, wherein the second lens of the second lens group is cemented to the third lens of the second lens group.

5. The compact zoom lens system of claim 1, wherein the third lens group has:

a first lens having a positive refractive power, the first lens of the third lens group being biconvex; and a second lens having a negative refractive power, the second lens of the third lens group being concave toward the object side.

6. The compact zoom lens system of claim 5, wherein the second lens of the third lens group is a meniscus lens.

7. The compact zoom lens system of claim 1, wherein the fourth lens group has:

a first lens having a negative refractive power, the first lens of the fourth lens group being concave toward an image plane; and a second lens having a positive refractive power, the second lens of the fourth lens group being biconvex.

8. The compact zoom lens system of claim 7, wherein the first lens of the fourth lens group is a meniscus lens.

9. The compact zoom lens system of claim 7, wherein the second lens of the fourth lens group has one aspherical surface.

10. The compact zoom lens system of claim 1, further satisfying the following conditions:

$$1.0<|f_{IV-1}/f_{IV}|<1.5$$

$$2.0<|f_{IV-1}/f_{IV-2}|<2.5$$

where $f_{IV}$ is a focal length of the fourth lens group, $f_{IV-1}$ is a focal length of a first lens of the fourth lens group, and $f_{IV-2}$ is a focal length of a second lens of the fourth lens group.

11. The compact zoom lens system of claim 1, further satisfying the following condition:

$$20<((V_{II-2})-(V_{II-1}))<30$$

where $V_{II-1}$ is a dispersion value of the first lens of the second lens group, and $V_{II-2}$ is the dispersion value of the second lens of the second lens group.

* * * * *